Patented July 24, 1928.

1,678,317

UNITED STATES PATENT OFFICE.

OTTO BILLETER, ERNST ROTHLIN, AND JULIUS PEYER, OF BASEL, SWITZERLAND, ASSIGNORS TO CHEMICAL WORKS, FORMERLY SANDOZ, OF BASEL, SWITZERLAND, A FIRM.

MANUFACTURE OF EASILY-SOLUBLE ANÆSTHETICS OF THE METAAMINOBENZOIC ACID ESTER SERIES.

No Drawing. Application filed March 3, 1927, Serial No. 172,551, and in Germany March 10, 1926.

The surface anæsthetic action of aminobenzoic acid esters has been known for a long time. Whilst among the para derivatives especially the para aminobenzoic acid ethylester has found an extensive use as surface anæsthetic agent, the meta aminobenzoic acid esters have not been employed to a larger extent in medicine. As the esters of aminobenzoic acids are as such almost insoluble in water and while being weak bases, yield very unstable, irritating salts with mineral acids and as these salts are in part only difficultly soluble, efforts have been made to obtain salts of aminobenzoic acid esters which satisfy the requirements of the surgeon with respect to their solubility, absence of irritating effects and stability. This has been done by using phenol sulphonic, phenolether-sulphonic and benzene-sulphonic acids according to the German specifications Nos. 147,790, 149,345 and 150,070.

It was observed, however, that these salts are not of a uniform composition. They especially show the disadvantage of being hydrolyzed, for instance when heated in watery solutions. This property excludes the possibility of their sterilizing before use. Contrarily to this, the use of sulphonic acids bearing the sulpho group in a side chain, leads to salts, (see German specification No. 147,345) which especially satisfy the requirement of sterilization. This German specification gives no details on the solubility in water of these salts, which are only prepared with benzylsulphonic acid. Only 0,5% solutions are mentioned, as coming into consideration for anæsthetic use and being stable when heated for a longer time at 100° C. For many purposes, especially for the anæsthesia of mucous membranes, where ordinary 10% solutions of cocaine are used, the salts of a surface anæsthetic agent must possess a much greater solubility while showing an absolute stability on boiling in watery solutions. The formation of well defined, crystallized salts of uniform constitution is a necessity for the exact dosage.

It has now been found that these requirements and especially that of great solubility in water, are fulfilled by salts of meta aminobenzoic acid esters with alkylsulphonic acids, for instance methane sulphonic and ethanesulphonic acid ($CH_3.SO_3H$, $C_2H_5SO_3H$). These salts have the general formula:

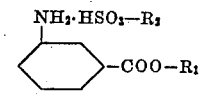

where $R_1$ and $R_2$ stand for aliphatic hydrocarbon radicals.

The new salts can be obtained by simply mixing equimolecular quantities of the acid and meta aminobenzoic acid ester or by double decomposition of suitable salts of these substances in suitable solvents. The new salts are exceedingly liable to crystallization. They are not hygroscopic, but very easily soluble in water; for instance 1,09 g. of meta aminobenzoic acid ethylester methanesulphonate can be immediately dissolved in 0,8 g. of water at 20° C. The aqueous solutions, even of higher concentrations do not show any alteration when heated for hours on the boiling water bath.

These properties could not have been foreseen, but they cause the meta aminobenzoic acid ester alkylsulphonate to be extremely well adapted for medical use. The isomers of these salts, for instance the methanesulphonate of para aminobenzoic acid ethylester, show a considerable hydrolyzation at ordinary temperature. If 2,0 g. of para aminobenzoic acid ethylester methanesulphonate are mixed with 10 ccm. of water, no clear solution can be obtained. The undissolved residue, about 0,2 g., is filtered off and consists of the free base, that is the pure para aminobenzoic acid ethylester, of the M. P. 90-91° C. The filtrate changes Congo paper to a deep blue. Contrarily to this the watery solution of meta aminobenzoic acid methane sulphonate remains absolutely clear and changes Congo paper only to pale violet. The less acid reaction of the meta derivative is obviously of a certain advantage for its use. On the other hand, salts of metaaminobenzoic acid ester with other sulphonic acids, f. i., the toluene sulphonate of meta aminobenzoic acid ethylester (M. P. 169-170° C. corr.; found N=4,14%, 0,1986 g. of the substance neutralized 5,90 ccm. of n/10 $H_2SO_4$ according to Kjeldahl, calculated N=4,15%) shows only a slight solubility in water. The Swiss specification No. 76,372 describes the orthophosphate of the meta aminobenzoic acid ethylester, but this salt also possesses a feeble solubility in water. This solubility is not sufficient for many purposes. On the tongue it first shows a disagreeable burning sensation. The respective methane or ethanesulphonate first gives a slightly acid taste, which lasts a short time, but afterwards a deep anæsthesia even in small quantities. With the special combination of the meta aminobenzoic acid esters with alkylsulphonic acids, new, well crystallized, not hygroscopic, but very easily soluble salts can be obtained, these salts being stable on boiling in aqueous solutions, and these facts undoubtedly constitute a technical progress in this domain.

The following examples illustrate the invention:

Example 1.

5 parts of meta aminobenzoic acid ethylester, dissolved in 5 parts of absolute alcohol and 2,9 parts of methanesulphonic acid, dissolved in 6 parts of absolute alcohol are mixed together by stirring. By the reaction the mixture gets warm. Thereupon the double volume of ethylacetate is added and the mixture filtered off quickly. On cooling the meta aminobenzoic acid ethylester methanesulphonate separates almost completely in form of crystals.

The new salt is purified by dissolving it in a small quantity of hot alcohol, mixed with the double volume of ethylacetate and filtered off immediately. On cooling the salt separates out in a pure state.

The meta aminobenzoic acid ethylester methanesulphonate forms fine needles of the M. P. 149–150° C. corr. It dissolves very readily in water; 1 g. dissolves at once in 0,8 g. of water at 20° C. The watery solution changes blue litmus paper to red, but it changes Congo paper only to pale violet. Meta aminobenzoic acid ethylester methanesulphonate is not hydrolyzed in aqueous solutions even when heated for a longer time.

*Analysis.*

0,3185 g. neutralized (Kjeldahl) 11,9 ccm. of 1/10 $H_2SO_4$
0,2940 g. neutralized (Kjeldahl) 10,8 ccm. of 1/10 $H_2SO_4$
$C_{10}H_{15}O_5NS$ calculated N=5,36%
    Found    5,24; 5,15%

Example 2.

5 parts of meta aminobenzoic acid ethylester, are caused to react with 3,3 parts of ethanesulphonic acid, as described in Example 1. The separation and further purification is executed in the same way as described in Example 1.

When recrystallized from a mixture of alcohol and ethylacetate, the meta aminobenzoic acid ethylester ethanesulphonate forms long, fine needles. It is very readily soluble in water and melts at 149–149,5° C. corr. (The M. P. of the mixture of this substance with that obtained according to Example 1 is 145–145,5° C. corr.) The watery solution of meta aminobenzoic acid ethylester ethanesulfonate changes blue litmus paper to red, but it changes Congo paper only to pale violet.

*Analysis.*

0,3210 g. neutralized 11,7 ccm. 1/10 n $H_2SO_4$
0,3063 g. neutralized 11,0 ccm. 1/10 n $H_2SO_4$
$C_{11}H_{17}O_5NS$ calculated N=5,13%
    Found    5,11; 5,03%

Example 3.

6 parts of meta aminobenzoic acid-n-propylester are caused to react with 3,2 parts of methanesulphonic acid, according to the manner indicated in Example 1. The separation and purification of the substance obtained is executed in the same way as mentioned in Example 1.

When recrystallized from a mixture of alcohol and ethylacetate, the meta aminobenzoic acid-n-propylester, methanesulphonate forms fine, colorless needles. It is readily soluble in water. The watery solution changes Congo paper only to pale violet. The new salt melts at 162–163° C. corr.

*Analysis.*

0,3232 g. neutralized 11,34 ccm. 1/10 n $H_2SO_4$
0,3166 g. neutralized 11,24 ccm. 1/10 n $H_2SO_4$
$C_{11}H_{17}O_5NS$ calculated N=5,09%
    Found    4,91; 4.97%

Example 4.

6 parts of meta aminobenzoic acid-n-propylester and 3,7 parts of ethanesulphonic acid are caused to react in the manner described in Example 1. The separation and further purification of the meta aminobenzoic acid-n-propylester ethanesulphonate is executed in the same way as described in Example 1.

When recrystallized from a mixture of alcohol and ethylacetate, the meta aminobenzoic acid-n-propylester ethanesulphonate forms fine, colorless needles. It is very readily soluble in water. The solutions change Congo paper only to pale violet. M. P. 150–151° C. corr.

*Analysis.*

0,5022 g. neutralized 17,3 ccm. 1/10 n $H_2SO_4$
0,3650 g. neutralized 12,13 ccm. 1/10 n $H_2SO_4$
$C_{12}H_{19}O_5NS$ calculated N=4,84%
    Found    4,83; 4,66%

Example 5.

9,6 parts of meta aminobenzoic acid isobutylester are caused to react with 4,8 parts of methane sulphonic acid in the manner described in Example 1. The new salt is separated and purified in the same way as indicated in Example 1.

When recrystallized from a mixture of alcohol and ethylacetate, the meta aminobenzoic-isobutylester-methanesulphonate forms fine, colorless needles. It is very readily soluble in water. The watery solutions change Congo paper only to pale violet. M. P. 178–179° C. corr.

*Analysis.*

0,3287 g. neutralized 11,34 ccm. 1/10 n $H_2SO_4$
0,3713 g. neutralized 22,63 ccm. 1/10 n $H_2SO_4$
$C_{12}H_{19}O_5NS$ calculated N=4,84%
          Found    4,83; 4,77%

EXAMPLE 6.

9,6 parts of meta aminobenzoic acid isobutylester and 5,5 parts of ethanesulphonic acid are caused to react in the manner described in Example 1. The separation and further purification is executed in the same way as indicated in Example 1.

When recrystallized from a mixture of alcohol and ethylacetate the meta aminobenzoic acid isobutylester-ethanesulphonate forms fine, colorless needles of the M. P. 138–139° C. corr. It is very readily soluble in water and the aqueous solution changes Congo paper to pale violet.

*Analysis.*

0,3114 g. neutralized 10,14 ccm. of 1/10 n $H_2SO_4$
0,3004 g. neutralized 9,70 ccm. of 1/10 n $H_2SO_4$
$C_{13}H_{21}O_5NS$ calculated N=4,62%
          Found    4,56; 4,52%

What we claim is:

As new articles of manufacture the herein described anæsthetics, consisting of salts of meta amino-benzoic acidesters, having the general formula

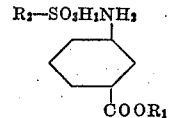

where $R_1$ and $R_2$ stand for aliphatic radicals, these salts constituting colorless crystals, being readily soluble in water with a very weak acid reaction, being stable in aqueous solution, even when heated for a longer time and possessing a powerful anæsthetic action.

In witness whereof we have hereunto signed our names this 17th day of February, 1927.

OTTO BILLETER.
ERNST ROTHLIN.
JULIUS PEYER.